US008103290B2

(12) United States Patent
Tien

(10) Patent No.: US 8,103,290 B2
(45) Date of Patent: Jan. 24, 2012

(54) GUIDING SYSTEM AND METHOD FOR GUIDING WIRELESS COMMUNICATION DEVICE IN WIRELESS COMMUNICATION NETWORK

(75) Inventor: Kai-Wen Tien, Tainan (TW)

(73) Assignee: Quanta Computer, Inc. (TW)

( * ) Notice: Subject to any disclaimer, the term of this patent is extended or adjusted under 35 U.S.C. 154(b) by 1008 days.

(21) Appl. No.: 12/003,192

(22) Filed: Dec. 20, 2007

(65) Prior Publication Data

US 2008/0287108 A1 Nov. 20, 2008

(30) Foreign Application Priority Data

May 16, 2007 (TW) .............................. 96117460 A

(51) Int. Cl.
*H04W 24/00* (2009.01)
(52) U.S. Cl. .................. 455/456.3; 455/423; 455/456.1; 342/450
(58) Field of Classification Search .................. 455/423, 455/456.1, 456.3; 342/450
See application file for complete search history.

(56) References Cited

U.S. PATENT DOCUMENTS

| 7,248,211 B2 * | 7/2007 | Hatch et al. ............. 342/357.31 |
| 2007/0010259 A1 * | 1/2007 | Hoffmann .................. 455/456.1 |
| 2007/0026870 A1 * | 2/2007 | Spain et al. ................ 455/456.1 |
| 2009/0005097 A1 * | 1/2009 | Shaffer et al. ................. 455/517 |

FOREIGN PATENT DOCUMENTS

| TW | I257819 | 7/2006 |
| TW | 200707938 | 2/2007 |
| TW | 200708158 | 2/2007 |

OTHER PUBLICATIONS

Office Action in related Taiwan Application No. 096117460 dated Jun. 8, 2011.
English Translation of Office Action in related Taiwan Application No. 096117460 dated Jun. 8, 2011.
English Abstract of TWI257819.

* cited by examiner

*Primary Examiner* — Dwayne Bost
*Assistant Examiner* — Amancio Gonzalez
(74) *Attorney, Agent, or Firm* — Thomas, Kayden, Horstemeyer & Risley, LLP.

(57) ABSTRACT

The invention provides a method for guiding a mobile communication device in a wireless communication network. At first, the method according to the invention determines a plurality of referenced positions covered in the wireless communication network. Afterward, the method obtains a plurality of communication quality parameters which each corresponds to one of the plurality of referenced positions. Next, the method transmits the plurality of referenced positions and the plurality of communication quality parameters to the mobile communication device and receives a target position from the mobile communication device. Then, the method determines a current position relative to the mobile communication device. Finally, according to the target position and the current position, the method generates a guiding information and transmits the guiding information to the mobile communication device.

10 Claims, 8 Drawing Sheets

GUIDING SYSTEM AND METHOD FOR GUIDING WIRELESS COMMUNICATION DEVICE IN WIRELESS COMMUNICATION NETWORK

BACKGROUND OF THE INVENTION

1. Field of the Invention

The invention relates to a guiding system and method and particularly, to a guiding system and method for guiding a mobile communication device in a wireless communication network.

2. Description of the Prior Art

With the extension of wireless communication network and the popularity of mobile communication devices with wireless internet access functions, such as notebooks, personal digital assistants, mobile phones, and navigation devices, users can easily uses these mobile communication devices to implement various online applications over the wireless communication network.

However, communication quality of the wireless communication network is sensitive to factors such as distance, buildings, topographic situations, and so on. A user usually does not know how to find the position with better communication quality when the user try to link to the wireless communication network via the mobile communication device.

Accordingly, a scope of the invention is to provide a guiding system and method for guiding a first mobile communication device in a wireless communication network to solve the aforesaid problem.

SUMMARY OF THE INVENTION

A scope of the invention is to provide a guiding system and method for guiding a first mobile communication device in a wireless communication network. The guiding system and method is capable of generating a guiding information according to a current position and a target position. Via the guiding information, the user can easily reach the target position to acquire better communication quality. Thereby, it is more convenient for the user to use the mobile communication device.

According to an embodiment of the invention, the guiding method firstly determines a plurality of referenced positions covered in the wireless communication network. Then, the method obtains a plurality of communication quality parameters which each corresponds to one of the plurality of referenced positions. Next, the method transmits the referenced positions and the communication quality parameters to the first mobile communication device. Afterward, the method receives a target position selected from the referenced positions from the first mobile communication device. After that, the method determines a current position relative to the first mobile communication device. Finally, the method generates a guiding information according to the target position and the current position and transmits the guiding information to the first mobile communication device.

According to another embodiment of the invention, the guiding system includes a positioning module, a transmitting module and a processing module. The positioning module is used for determining a plurality of referenced positions covered in the wireless communication network, determining a current position relative to the first mobile communication device, and receiving a plurality of the communication quality parameters which each corresponds to one of the plurality of referenced positions. The processing module is coupled to the positioning module and the transmitting module respectively. The processing module is used for transmitting the referenced positions and the communication quality parameters to the first mobile communication device through the transmitting module, receiving a target position selected from the referenced positions from the first mobile communication device, generating a guiding information in accordance with the target position and the current position, and transmitting the guiding information the first mobile communication device through the transmitting module.

Therefore, the guiding system and method is capable of generating a guiding information according to a current position and a target position. Via the guiding information, the user can easily reach the target position to achieve better communication quality. Thereby, it is more convenient for the user to use the mobile communication device.

The advantage and spirit of the invention may be understood by the following recitations together with the appended drawings.

BRIEF DESCRIPTION OF THE APPENDED DRAWINGS

DETAILED DESCRIPTION OF THE INVENTION

Figure 1:
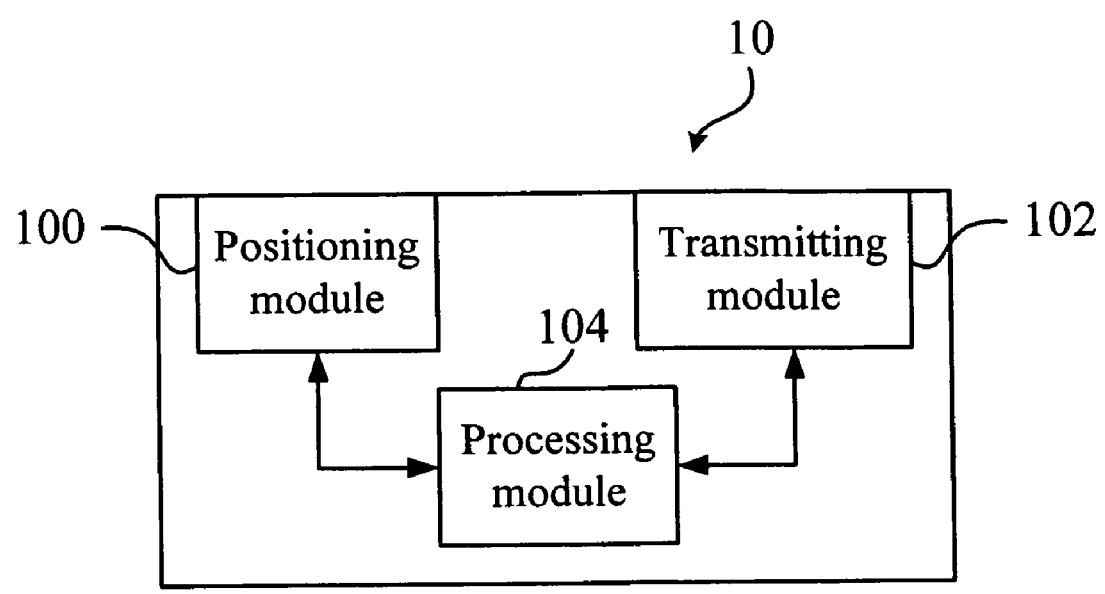
FIG. 1 shows a functional block diagram of the guiding system according to an embodiment of the invention.
Figure 2:
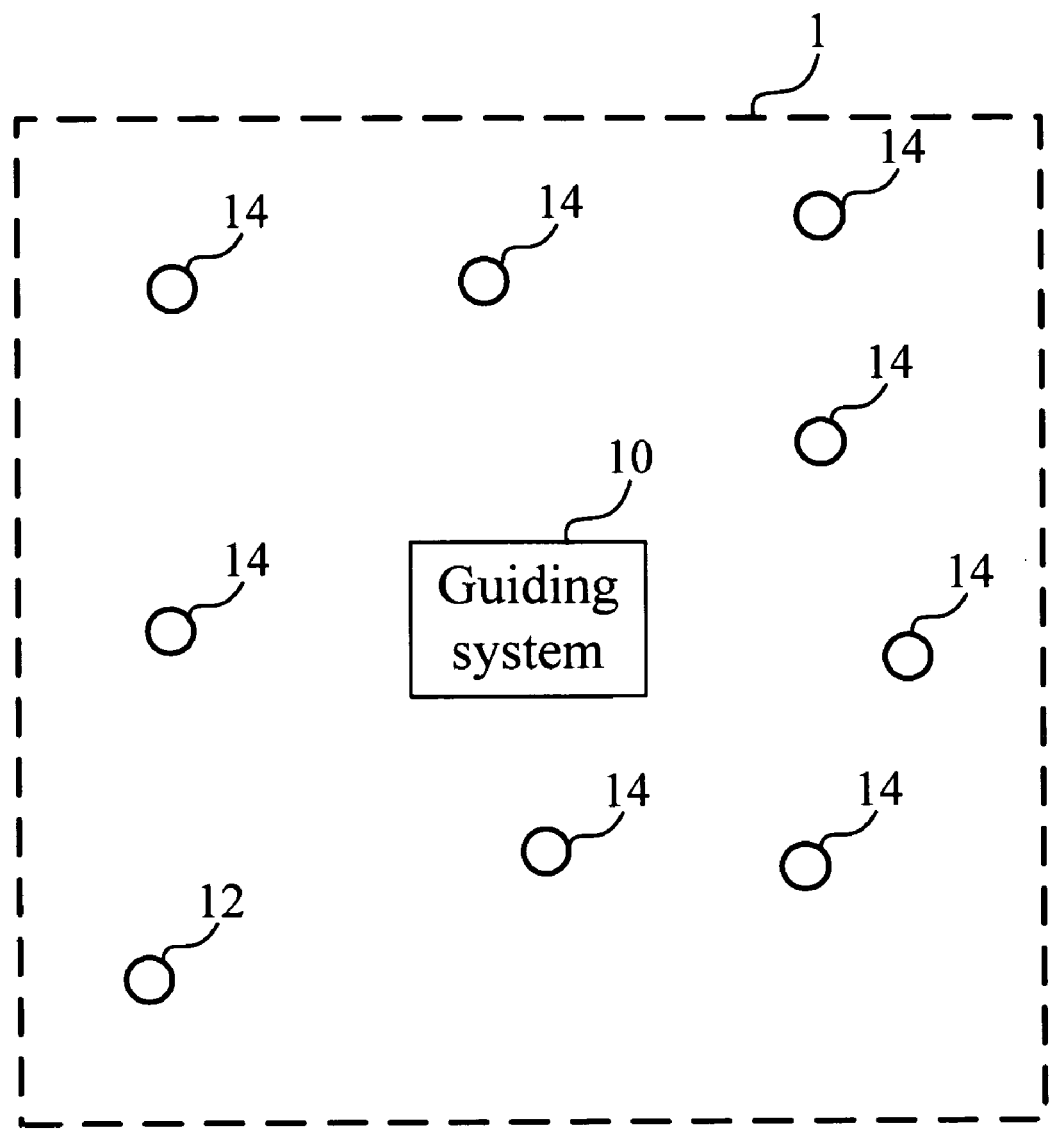
FIG. 2 shows the guiding system shown in FIG. 1 in a wireless communication network.

Please refer to FIG. 1 and FIG. 2. FIG. 1 shows a functional block diagram of the guiding system 10 according to an embodiment of the invention. FIG. 2 shows the guiding system 10 shown in FIG. 1 in a wireless communication network 1. In the embodiment, the guiding system 10 is capable of guiding a first mobile communication device 12 in a wireless communication network 1, as shown in FIG. 2. In FIG. 1, the guiding system 10 includes a positioning module 100, a transmitting module 102 and a processing module 104. The processing module 104 is coupled to the positioning module 100 and the transmitting module 102 respectively.

Figure 3:
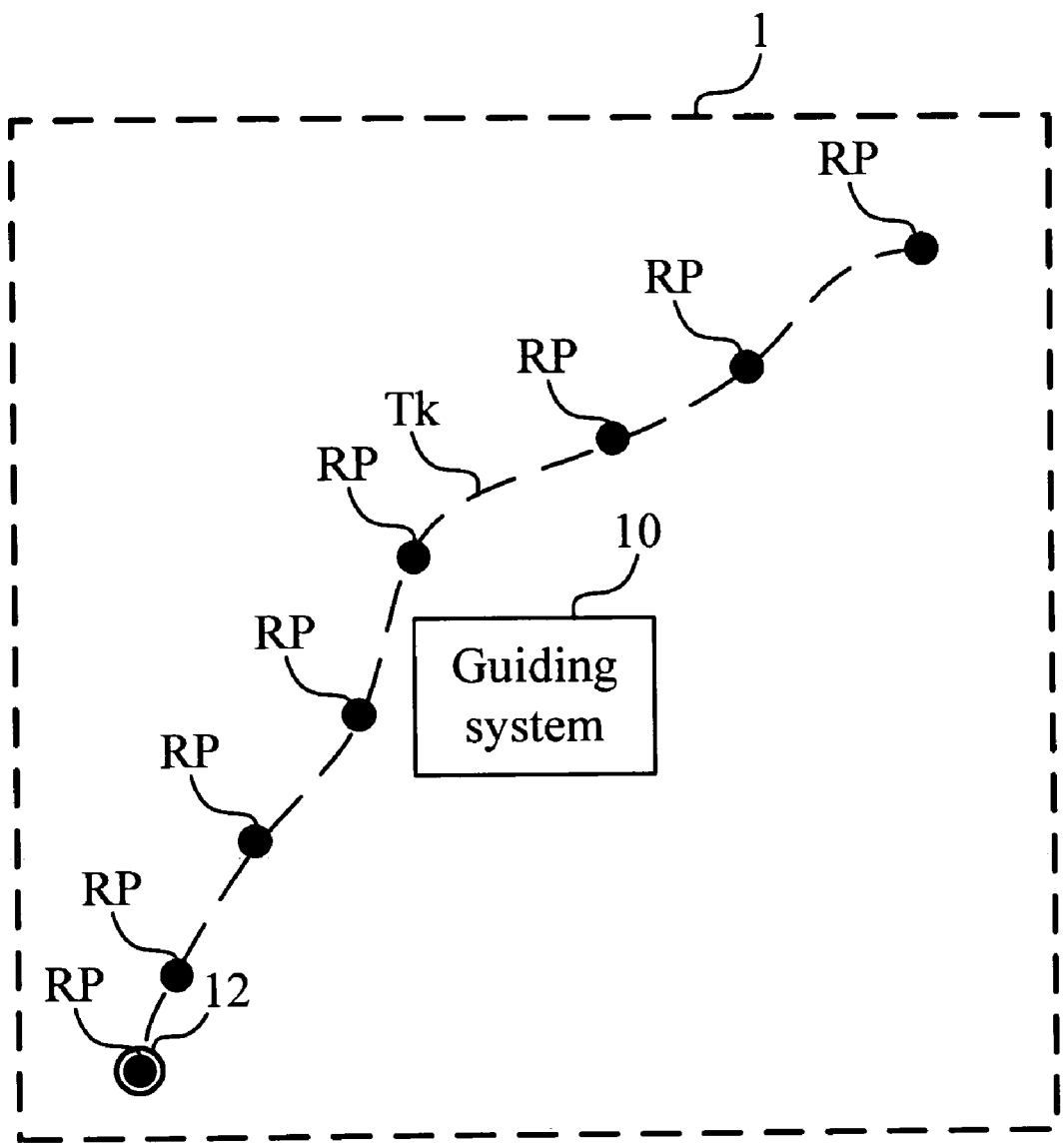
FIG. 3 shows the guiding system and the referenced positions of the first mobile communication device determined by the positioning module.
Figure 4:
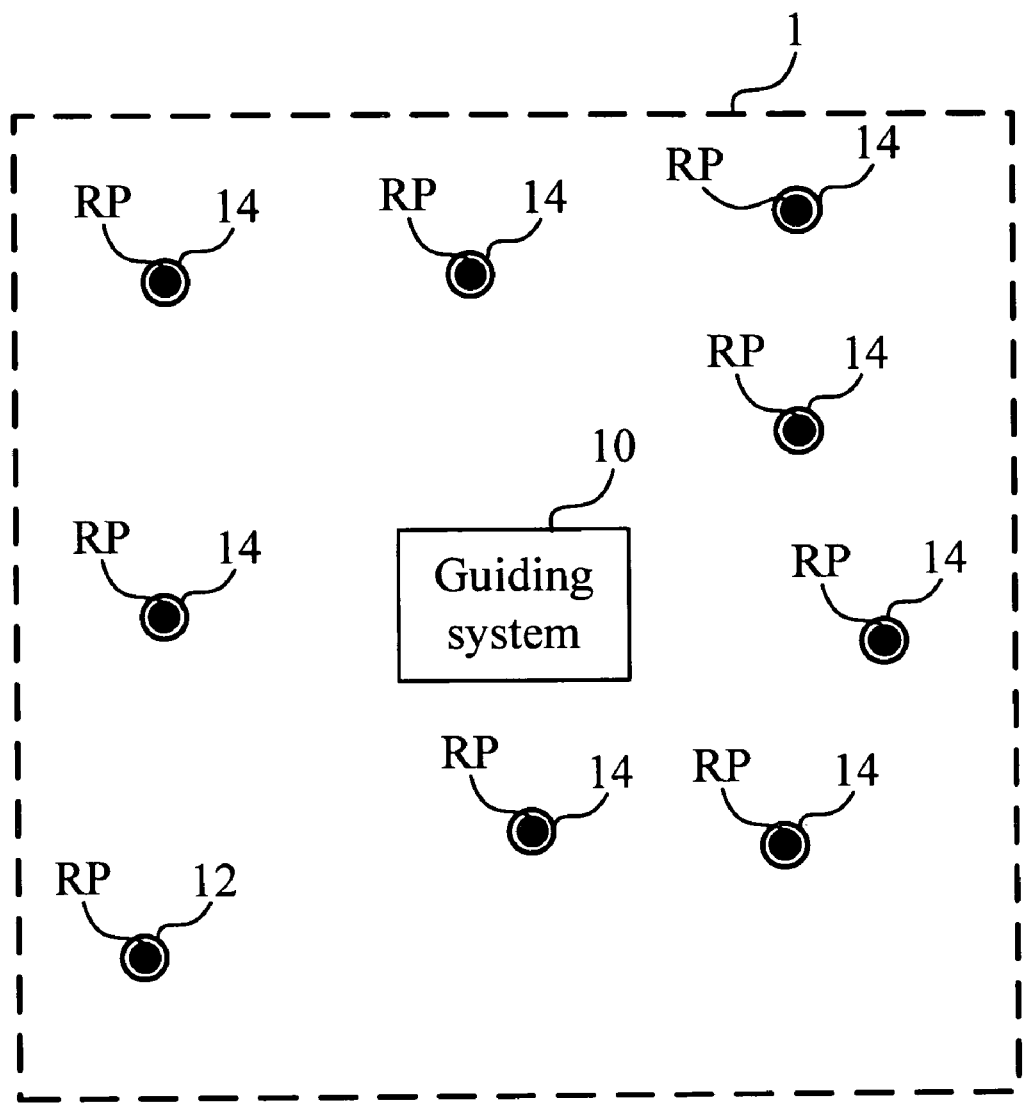
FIG. 4 shows the guiding system and the referenced positions of the second mobile communication devices determined by the positioning module.

Please refer to FIG. 3 and FIG. 4. FIG. 3 shows the guiding system 10 and the referenced positions RP of the first mobile communication device 12 determined by the positioning module 100. FIG. 4 shows the guiding system 10 and the referenced positions RP of the second mobile communication devices 14 determined by the positioning module 100. In the embodiment, the positioning module 100 is capable of determining the plurality of referenced positions RP covered in the wireless communication network 1. In practice, the positioning module 100 could be assisted by at least one assisting mobile communication device with positioning function to determine the referenced positions RP covered in the wireless communication network 1.

In an embodiment, the referenced positions RP are determined during a movement of the first mobile communication device 12. As shown in FIG. 3, the first mobile communication device 12 moves along a track Tk, and the positioning module 100 can determine a plurality of referenced positions on the track Tk during the movement of the first mobile communication device 12.

In actual applications, time length of the movement (i.e. when to begin and finish the determination of the referenced positions RP) can be, but not limited to, defined by the user, a motion sensor (not shown) or the positioning module 100. For example, the user can set the time length of the movement. Otherwise, the time length can be determined by a motion sensor incorporated with a clock disposed in the first mobile communication device 12. Furthermore, the positioning module 100 can determine the positions of the first mobile communication device 12 and cooperate with a clock to calculate the time length of the movement of the first mobile communication device 12.

In the embodiment, the first mobile communication device 12 can measure a received signal strength at each of the referenced positions RP it passes through, and the positioning module 100 can receive the received signal strengths. In the embodiment, the communication quality parameter can be, but not limited to, the received signal strength. In practice, the positioning module 100 can receive the received signal strengths through a receiving module (not shown).

In another embodiment, the referenced positions RP are determined relative to a plurality of second mobile communication devices 14. As shown in FIG. 4, the positioning module 100 can determine plural referenced positions RP relative to the second mobile communication devices 14. In the embodiment, each of the second mobile communication devices 14 can measure a received signal strength corresponding to one of the referenced positions RP, and the positioning module 100 can receive the received signal strengths.

In another embodiment, the positioning module can determine a referenced position RP relative to the first mobile communication device 12 and plural referenced positions RP relative to the second mobile communication devices 14. In the embodiment, the first mobile communication device 12 can measure a received signal strength corresponding to its referenced position RP, and the positioning module 100 can receive the received signal strengths. Besides, each of the second mobile communication devices 14 can measure a received signal strength corresponding to one of the referenced positions RP, and the positioning module 100 can receive the received signal strengths.

In the embodiment, the processing module 104 can transmit the referenced positions RP and the received signal strengths to the first mobile communication device 12 through the transmitting module 102. The processing module 104 also receives a target position TP selected from the referenced positions RP from the first mobile communication device 12. In practice, the processing module 104 can receive the target position TP through the receiving module described above.

Figure 5:
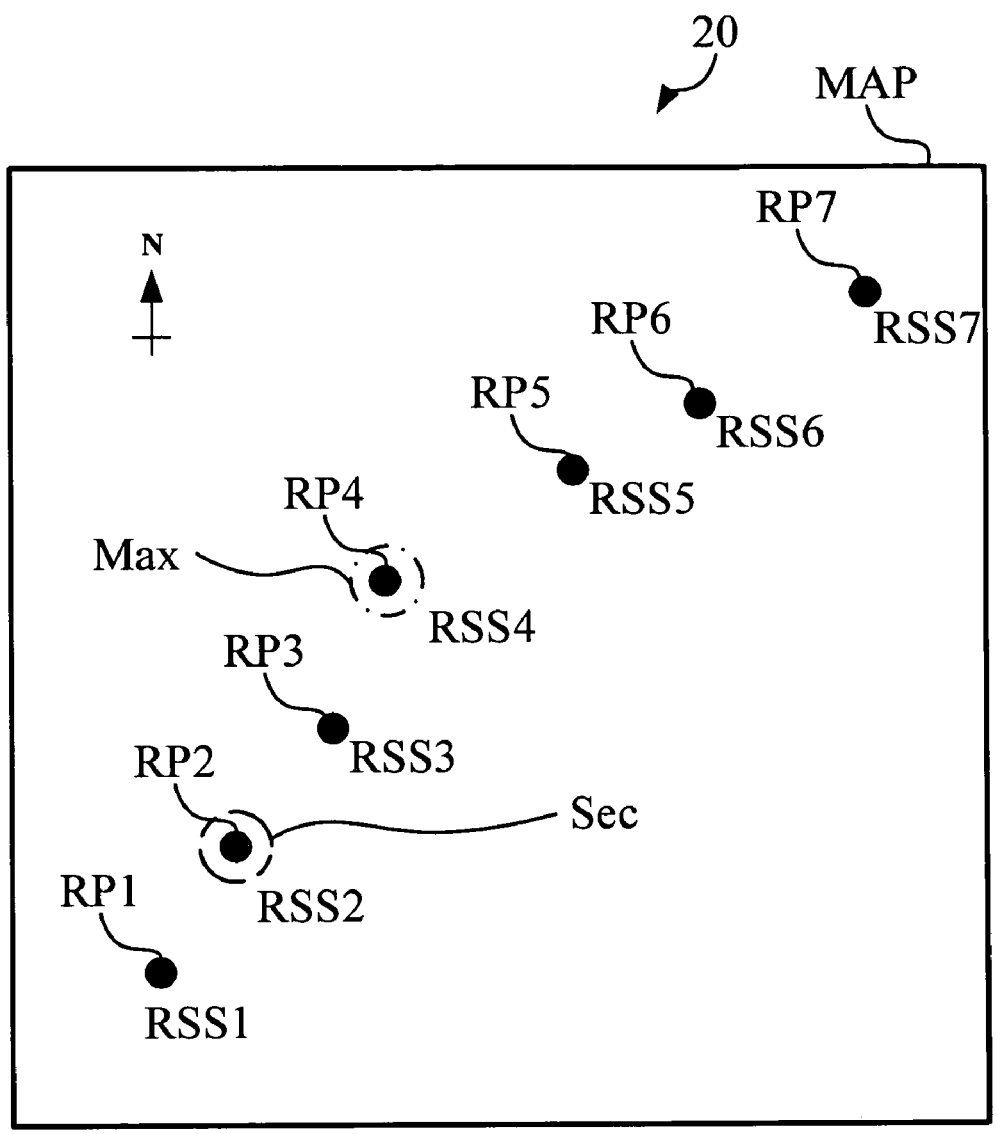
FIG. 5 shows the received signal strength distribution map generated by the processing module shown in FIG. 1.

Please refer to FIG. 5. FIG. 5 shows a received signal strength distribution map 20 generated by the processing module 104 shown in FIG. 1. In actual applications, the processing module 104 can generate the received signal strength distribution map 20 according to the referenced positions RP and corresponding received signal strengths, as shown in FIG. 5. The received signal strength distribution map 20 includes a map MAP, a plurality of referenced positions RP1-RP7 and a plurality of received signal strengths RSS1-RSS7, where each of the plurality of received signal strengths RSS1-RSS7 corresponds to one of the plurality of referenced positions RP1-RP7. A user can refer to the received signal strength distribution map 20 and determine a target position TP according to the received signal strengths RSS1-RSS7, topographic situations of the referenced positions RP1-RP7 and other factors. In other words, the target position TP is not necessarily the position with the strongest received signal strength. It could be the position determined by the user according to the received signal strengths RSS1-RSS7, topographic situations of the referenced positions RP1-RP7 and other factors. In addition, the received signal strength distribution map 20 can further include a mark of the strongest received signal strength Max (on the received signal strength RSS4 shown in FIG. 5) and a mark of the second strongest received signal strength Sec (on the received signal strength RSS2 shown in FIG. 5) for user reference.

Figure 6:
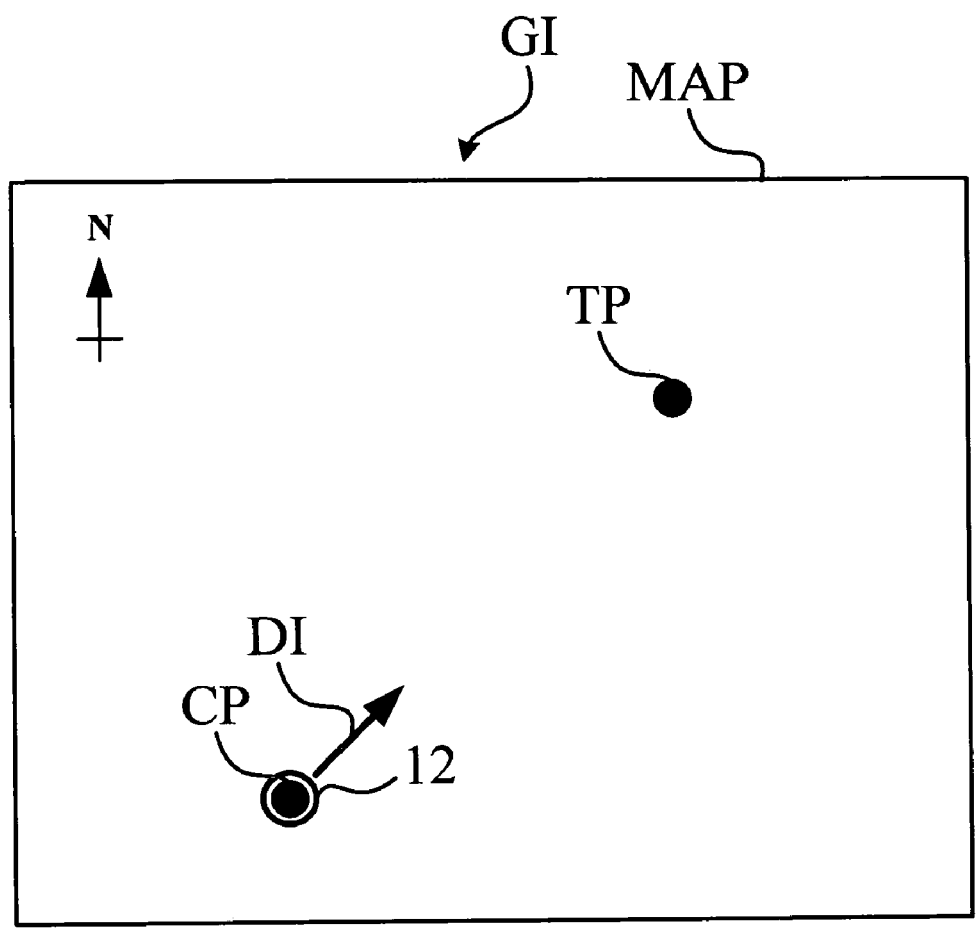
FIG. 6 shows the guiding information generated by the processing module shown in FIG. 1.

Please refer to FIG. 6. FIG. 6 shows the guiding information GI generated by the processing module 104 shown in FIG. 1. The positioning module 100 can determine a current position CP relative to the first mobile communication device 12. The processing module 104 can generate a guiding information GI in accordance with the target position TP received from the first mobile communication device 12 and the current position CP. The processing module 104 can also transmit the guiding information GI to the first mobile communication device 12 through the transmitting module 102. As shown in FIG. 6, the guiding information GI includes, but not limited to, a map MAP and a direction icon DI. According to the guiding information GI, the user can reach the target position TP easily. Since the first mobile communication device 12 has better received signal strength at the target position TP, the user can acquire excellent communication quality when using the first mobile communication device 12 at the target position TP.

Figure 7:
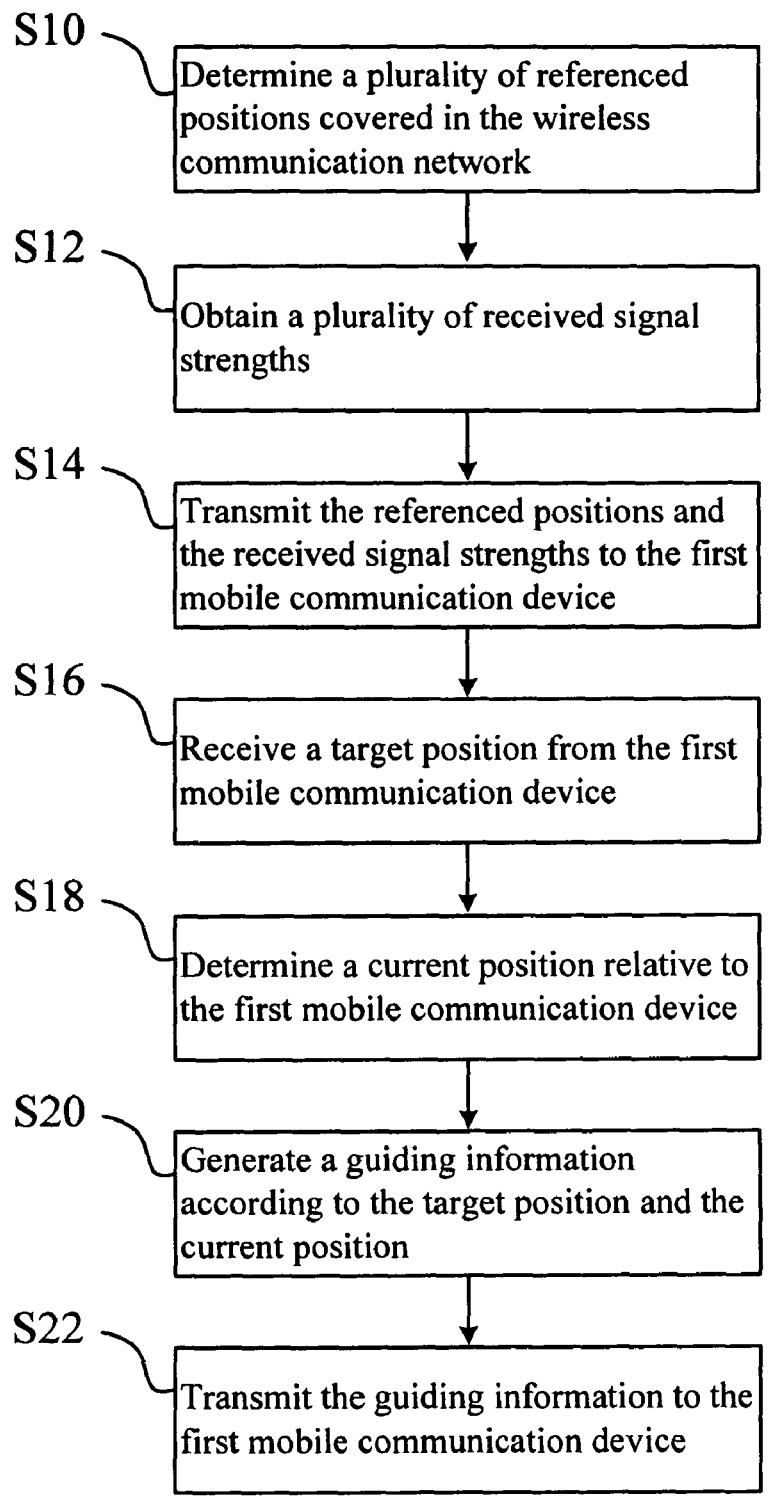
FIG. 7 shows a flow chart of the method for guiding the first mobile communication device according to an embodiment of the invention.

Please refer to FIG. 7, together with FIG. 2 to FIG. 6. FIG. 7 shows a flow chart of the method for guiding the first mobile communication device 12 according to an embodiment of the invention. In the embodiment, the method can be used for guiding the first mobile communication device 12 in a wireless communication network 1. As shown in FIG. 7, the method, firstly, performs step S10 to determine a plurality of referenced positions RP covered in the wireless communication network 1. In an embodiment, the referenced positions RP can be determined during a movement of the first mobile communication device 12. In another embodiment, the referenced positions RP are determined relative to a plurality of second mobile communication devices 14. In still another embodiment, the plurality of referenced positions RP are determined relative to the first mobile communication device 12 and a plurality of second mobile communication devices 14. The method for determining the referenced positions RP is as described above.

Then, the method performs step S12 to obtain plural received signal strengths which each corresponds to one of the plurality of referenced positions RP. Method for obtaining the received signal strengths is as described above. Next, the method performs step S14 to transmit the referenced positions RP and the received signal strengths to the first mobile communication device 12. Afterwards, the method performs step S16 to receive a target position TP selected from the referenced positions RP from the first mobile communication device 12. Then, the method performs step S18 to determine a current position CP relative to the first mobile communication device 12. After that, the method performs step S20 to generate a guiding information GI according to the target position TP and the current position CP. Finally, the method performs step S22 to transmit the guiding information GI to the first mobile communication device 12. According to the guiding information GI, the user can reach the target position TP easily. Since the first mobile communication device 12 has better received signal strength at the target position TP, the user can acquire excellent communication quality when using the first mobile communication device 12 at the target position TP.

Figure 8:
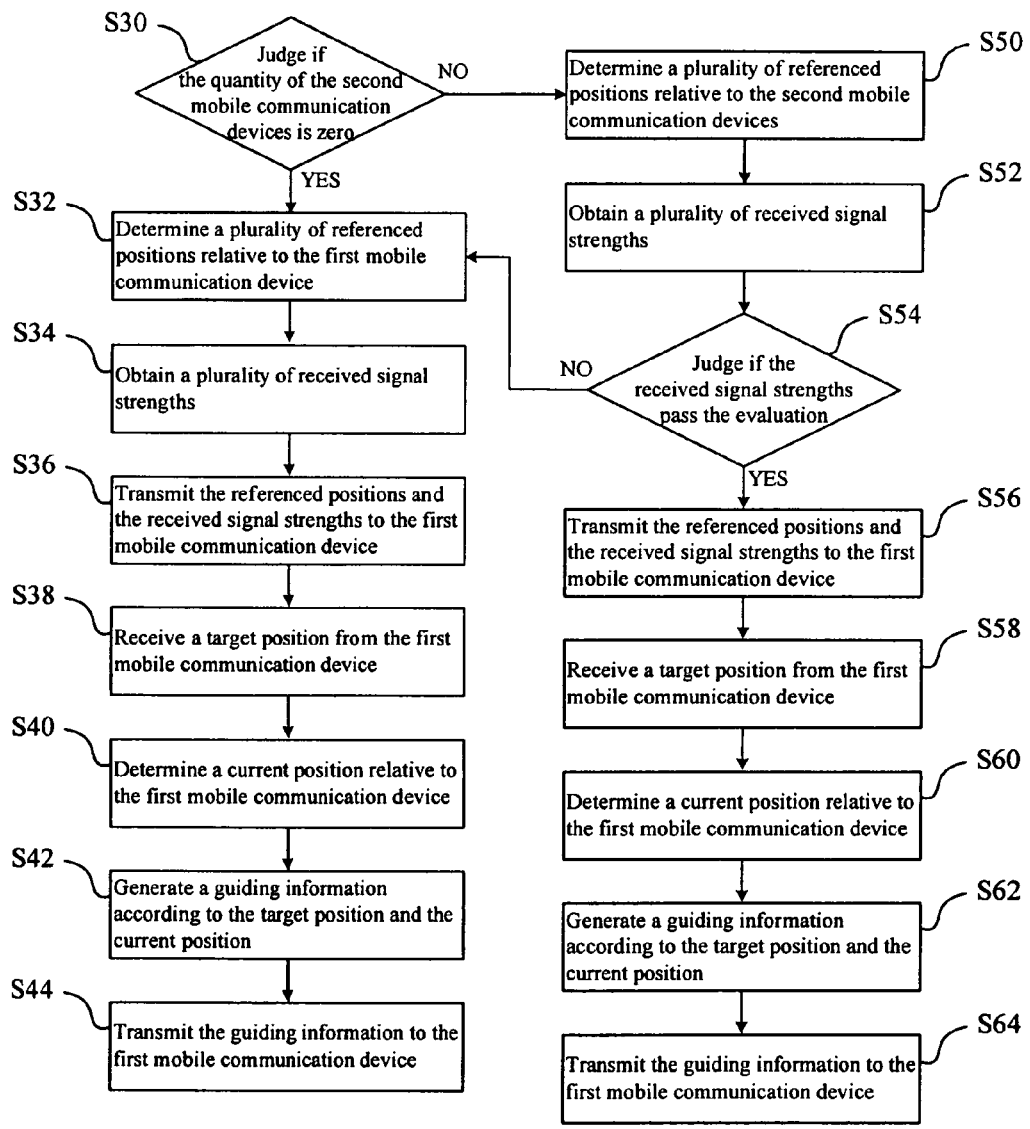
FIG. 8 shows a flow chart of the method for guiding the first mobile communication device according to another embodiment of the invention.

Please refer to FIG. 8, together with FIG. 2 to FIG. 6. FIG. 8 shows a flow chart of the method for guiding the first mobile communication device 12 according to another embodiment of the invention. In the embodiment, the method includes following steps. Firstly, the method performs step S30 to judge whether the quantity of the second mobile communication devices 14 is zero, and if YES, performs step S32, if NO, performs step S50.

Step S32 is to determine a plurality of referenced positions RP relative to the first mobile communication device 12, and then performs step S34. In an embodiment, the reference positions RP can be determined during a movement of the first mobile communication device 12. Then, the method performs step S34 to obtain plural received signal strengths which each corresponds to one of the plurality of referenced positions RP. Method for obtaining the received signal strengths is as described above. Next, the method performs step S36 to transmit the referenced positions RP and the received signal strengths to the first mobile communication device 12. Afterwards, the method performs step S38 to receive a target position TP selected from the referenced positions RP from the first mobile communication device 12. Then, the method performs step S40 to determine a current position CP relative to the first mobile communication device 12. After that, the method performs step S42 to generate a guiding information GI according to the target position TP and the current position CP. Finally, the method performs step S44 to transmit the guiding information GI to the first mobile communication device 12. According to the guiding information GI, the user can reach the target position TP easily. Since the first mobile communication device 12 has better received signal strength at the target position TP, the user can acquire excellent communication quality when using the first mobile communication device 12 at the target position TP.

Step S50 is to determine a plurality of referenced positions RP relative to the first mobile communication device 12 and the second mobile communication devices 14. Then, the method performs step S52 to obtain plural received signal strengths which each corresponds to one of the plurality of referenced positions RP. Method for obtaining the received signal strengths is as described above. Afterwards, the method performs step S54 to evaluate the plurality of received signal strengths in a evaluation way and judging if the received signal strengths pass the evaluation, and if YES, performs step S56, if NO, performs step S32. It is noticeable that in the evaluation way according to an embodiment, the method can judge whether the received signal strength of the first mobile communication device 12 larger than each of the received signal strengths of the second mobile communication devices 14, and if YES, performs step S32, if NO, performs step S56. In the evaluation way according to another embodiment, the method can judge whether each of the received signal strengths smaller than a threshold, and if YES, performs step S32, if NO, performs step S56.

Step S56 is to transmit the referenced positions TP and the received signal strengths to the first mobile communication device 12. Afterwards, the method performs step S58 to receive a target position TP selected from the referenced positions RP from the first mobile communication device 12. Then, the method performs step S60 to determine a current position CP relative to the first mobile communication device 12. After that, the method performs step S62 to generate a guiding information GI according to the target position TP and the current position CP. Finally, the method performs step S64 to transmit the guiding information GI to the first mobile communication device 12. According to the guiding information GI, the user can reach the target position TP easily. Since the first mobile communication device 12 has better received signal strength at the target position TP, the user can acquire excellent communication quality when using the first mobile communication device 12 at the target position TP.

Comparing to prior arts, the guiding method and system of the invention is capable of generating a guiding information according to a current position and a target position. Via the guiding information, the user can easily reach the target position to acquire better communication quality. Thereby, it is more convenient for the user to use the mobile communication device.

With the example and explanations above, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:

1. A method for guiding a first mobile communication device in a wireless communication network, said method comprising the steps of:
   determining a plurality of referenced positions covered in the wireless communication network, wherein the plurality of referenced positions are determined relative to the first mobile communication device or N second mobile communication devices, N being an integer;
   obtaining a plurality of communication quality parameters which each corresponds to one of the plurality of referenced positions;
   generating a map according to the plurality of communication quality parameters and the plurality of referenced positions;
   transmitting the referenced positions and the communication quality parameters to the first mobile communication device;
   receiving a target position selected from the referenced positions from the first mobile communication device;
   determining a current position relative to the first mobile communication device; and
   according to the target position and the current position and the map, generating a guiding information, and transmitting the guiding information to the first mobile communication device.

2. The method of claim 1, wherein each of the communication quality parameters is a received signal strength (RSS).

3. The method of claim 1, further comprising the step of judging whether N is zero before determining the plurality of referenced positions, and if YES, the plurality of referenced positions are determined relative to the first mobile communication device during its movement, if NO, the plurality of referenced positions are determined relative to the N second mobile communication devices.

4. The method of claim 3, if the plurality of referenced positions are determined relative to the N second mobile communication devices, further comprising the step of, after obtaining the plurality of communication quality parameters, evaluating the plurality of communication quality parameters in a evaluation way and judging if the plurality of communication quality parameters pass the evaluation, and if YES, performing the step of transmitting the referenced positions and the communication quality parameters to the first mobile communication device, if NO, renewedly performing the step of determining the plurality of referenced positions covered in the wireless communication network where the plurality of referenced positions are determined relative to the first mobile communication device during its movement.

5. The method of claim 1, wherein the guiding information comprises a direction icon.

6. A guiding system for guiding a first mobile communication device in a wireless communication network, said guiding system comprising:
- a positioning module for determining a plurality of referenced positions covered in the wireless communication network, determining a current position relative to the first mobile communication device, and receiving a plurality of the communication quality parameters which each corresponds to one of the plurality of referenced positions, wherein the plurality of referenced positions are determined relative to the first mobile communication device or N second mobile communication devices, N being an integer;
- a transmitting module; and
- a processing module, coupled to the positioning module and the transmitting module respectively, for generating a map according to the plurality of communication quality parameters and the plurality of referenced positions, transmitting the referenced positions and the communication quality parameters to the first mobile communication device through the transmitting module, receiving a target position selected from the referenced positions from the first mobile communication device, generating a guiding information in accordance with the target position, the current position and the map, and transmitting the guiding information to the first mobile communication device through the transmitting module.

7. The guiding system of claim 6, wherein each of the communication quality parameters is a received signal strength (RSS).

8. The guiding system of claim 6, wherein the positioning module judges whether N is zero before determining the plurality of referenced positions, if YES, the plurality of referenced positions are determined relative to the first mobile communication device during its movement, if NO, the plurality of referenced positions are determined relative to the N second mobile communication devices.

9. The guiding system of claim 8, wherein if the plurality of referenced positions are determined relative to the N second mobile communication devices, after the plurality of communication quality parameters are received, the processing module evaluates the plurality of communication quality parameters in a evaluation way and judges if the plurality of communication quality parameters pass the evaluation, if YES, the processing module transmits the referenced positions and the communication quality parameters to the first mobile communication device, if NO, the positioning module renewedly determines the plurality of referenced positions covered in the wireless communication network where the plurality of referenced positions are determined relative to the first mobile communication device during its movement.

10. The guiding system of claim 6, wherein the guiding information comprises a direction icon.

* * * * *